United States Patent [19]

Lohse et al.

[11] 4,022,753

[45] May 10, 1977

[54] REACTION PRODUCTS OF POLYSILOXANES AND POLYPHENOLS

[75] Inventors: Friedrich Lohse, Oberwil; Bruno Schreiber, Aesch, both of Switzerland

[73] Assignee: Ciba-Geigy Corporation, Ardsley, N.Y.

[22] Filed: Mar. 6, 1975

[21] Appl. No.: 556,069

[30] Foreign Application Priority Data

Mar. 25, 1974 Switzerland .................. 4108/74

[52] U.S. Cl. .................... 260/46.5 R; 260/824 R; 260/826
[51] Int. Cl.$^2$ ........................................ C08G 77/04
[58] Field of Search ............... 260/824 R, 23, 826, 260/46.5 R, 448.2 B

[56] References Cited

UNITED STATES PATENTS

| | | |
|---|---|---|
| 2,584,351 | 2/1952 | Hunter et al. ................ 260/2 SX |
| 2,755,269 | 7/1956 | Moorhead ............. 260/46.5 R X |
| 2,885,384 | 5/1959 | Sterman ..................... 260/826 X |
| 2,927,910 | 3/1960 | Cooper ..................... 260/46.5 R |
| 3,356,758 | 12/1967 | Omietanski et al. ...... 260/46.5 R X |

*Primary Examiner*—Lewis T. Jacobs
*Attorney, Agent, or Firm*—Nestor W. Shust

[57] ABSTRACT

Reaction products, containing phenolic hydroxyl groups, of polysiloxanes and polyphenols are obtained by reacting alkoxy-terminated or acyloxy-terminated polysiloxane compounds with polyphenols at elevated temperature, employing 1.2 to 10 equivalents of phenolic hydroxyl groups per 1 equivalent of alkoxy group or acyloxy group. The reaction products containing hydroxyl groups can be used for curing and modifying epoxide resins and give flexible, hydrophobic plastics of valuable mechanical and dielectric properties.

1 Claim, No Drawings

REACTION PRODUCTS OF POLYSILOXANES AND POLYPHENOLS

The present invention relates to new reaction products of polysiloxanes and polyphenols, a process for their manufacture and the use of the new products for curing or modifying epoxide resins.

The use of polyphenols as curing agents for epoxide resins has been known for a long time. The epoxide resins cured with polyphenols are moulded materials having valuable properties but have the disadvantage that under the influence of water the properties of the moulded materials deteriorate.

Plastics modified with siloxane compounds are also known. Polysiloxanes containing hydroxyl end groups have also already been proposed for modifying synthetic resins. British Patent Specification No. 880,022 describes a process for the manufacture of polyoxyalkylene-polysiloxanediol block copolymers by reaction of polyoxyalkylene glycols of a certain chain length with dialkoxy-terminated polysiloxanes. These polysiloxanediol block copolymers are used - where they are water-insoluble compounds - as plasticisers for rubbers. When used as modifiers for epoxide resins, however, they suffer from the disadvantage that they do not impart hydrophobic properties to the modified resin.

German Auslegeschrift No. 1,618,836 proposes trisiloxanols, of which the hydroxyl groups are directly bonded to the Si atoms, as modifiers for organic resin, such as polyester, urethane and epoxide resins. However, these siloxanols suffer from the disadvantage that their processing conjointly with epoxide resins presents difficulties, so that they are not very suitable for use as modifiers.

It has now been found that the properties of the epoxide resins cured with conventional phenols can be improved and the processing difficulties of the conventional polysiloxane compounds when used conjointly with epoxide resins can be overcome if the curing agents used for epoxide resins are polyphenols which are obtained by reaction of certain polysiloxane compounds with polyphenols in certain stoichiometric ratios. The new mixtures, which consist of, or contain, polyphenols which have been (so-called) "advanced" with polysiloxanes can be readily manufactured according to the invention and impart to the epoxide resin, cured therewith, advantageous properties in particular with regard to very low water absorption coupled with good hydrophobic properties.

Accordingly, the subject of the present invention are new reaction products, containing phenolic hydroxyl groups, of polysiloxanes and polyphenols, which can be obtained by reacting polysiloxane compounds of the formula I

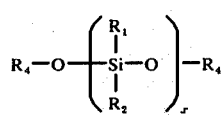
(I)

wherein $R_1$ and $R_2$ are identical or different and each denote a methyl, ethyl, propyl, or phenyl group, and $R_1$ and $R_2$ can denote different substituents along the polysiloxane chain, the radicals $R_4$ each denote an alkyl group or acyl group and x represents a number from 2 to 30, with polyphenols of the formula II

(II)

wherein $R_3$ denotes the radicals of a diphenol or polyphenol, obtained by removing the phenolic hydroxyl groups, and n denotes a number from 2 to 6, at elevated temperatures, using 1.2 to 10, preferably 2 to 6, equivalents of phenolic hydroxyl groups per 1 equivalent of alkyl group or acyl group.

Preferentially, the invention relates to reaction products of polysiloxane compounds of the formula I, wherein $R_1$ and $R_2$ each denote a methyl, ethyl, propyl or phenyl group and $R_1$ and $R_2$ on the same Si atom denote identical substituents and along the siloxane chain denote different substituents, x denotes a number from 3 to 20 and the radicals $R_4$ denote lower alkyl groups with 1 − 4 C atoms, especially methyl groups, and polyphenols of the formula II, wherein n denotes a number from 2 to 5, the products being obtained by reaction of 1 mol of a polysiloxane of the formula I with 2 mols of a polyphenol of the formula II.

The new reaction products, containing phenolic hydroxyl groups, of polysiloxanes and polyphenols are manufactured by reacting polysiloxane compounds of the formula I

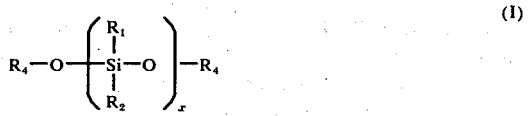
(I)

wherein $R_1$ and $R_2$ are identical or different and each denote a methyl, ethyl, propyl or phenyl group and $R_1$ and $R_2$ can denote different substituents along the polysiloxane chain, the radicals $R_4$ each denote an alkyl group or an acyl group and x represents a number from 2 to 30, with polyphenols of the formula II

(II)

wherein $R_3$ denotes the radical of a diphenol or a polyphenol obtained by removing the phenolic hydroxyl groups and n denotes a number from 2 to 6, at elevated temperatures, preferably in the temperature range from 150° to 220° C, and employing 1.2 to 10, preferably 2 to 6, equivalents of phenolic hydroxyl groups per 1 equivalent of alkyl group or acyl group.

Preferably, this process starts from polysiloxanes of the formula I, wherein x denotes a number from 3 to 20 and the radicals $R_4$ denote lower alkyl groups with 1 − 4 C atoms, especially methyl groups, the polysiloxanes being reacted with a polyphenol of the formula II, wherein n denotes a number from 2 to 5, 2 mols of a polyphenol of the formula II being employed per 1 mol of a polysiloxane compound for the formula I.

Preferably, this process starts from polysiloxane compounds of the formula I, wherein $R_1$ and $R_2$ denote a methyl, ethyl, propyl or phenyl group, and $R_1$ and $R_2$ on the same Si atom denote identical substituents and along the siloxane chain denote different substituents, and x denotes a number from 3 to 20.

The reaction can be carried out in a known manner by mixing the alkoxy-terminated or acyloxy-terminated polysiloxanes of the formula I with the polyphenols of the formula II in the stated stoichiometric ratio at elevated temperatures and with vigorous stirring, and continuing the reaction, in the temperature range of about 100° to 250° C, preferably 150° to 220° C, until the theoretical amount of alcohol or monocarboxylic acid liberated in the reaction is obtained. The end of the reaction can also be determined from a sample cooled to room temperature. When the reaction has been completed, phase separation no longer occurs in a cooled sample. The uncatalysed reaction is complete after between 2 and 10 hours, depending on the reaction temperature.

The course of the reaction can also be followed analytically by means of proton-magnetic resonance spectroscopy. For example, as the reactions take place the signals of the SiOCH$_3$ protons at δ3.2 – 3.6 (100 Mc, measured in CDCl$_3$) disappear completely.

As a rule, the presence of a catalyst in this process is superfluous. However, basic, acid or neutral catalysts can be used to accelerate the reaction. The catalysts used are preferably titanic acid esters, such as tetrabutyl titanate or tetraisopropyl titanate, quaternary ammonium salts, such as tetramethylammonium chloride, aluminum halides and boron halides or carboxylic acids, especially trifluoroacetic acid, and the catalyst named in the initially mentioned British Patent Specification No. 880,022.

The polysiloxanes of the formula I, containing alkoxy groups or acyloxy groups, are known compounds, the preparation of which is summarised by W. Noll in "Chemie und Technologie der Silicone" ("Chemistry and Technology of the Silicones"), Verlag Chemie GmbH, 1968, on pages 162 – 206.

Examples of polysiloxanes, containing alkoxy or acyloxy groups, of the formula I which may be mentioned are the methoxy-, ethoxy- and acetoxy-terminated polydimethylsiloxanes, polymethylpropylsiloxanes, polymethylphenylsiloxanes and polyphenylsiloxanes. The average molecular weight of these polysiloxanes is in the range from 300 to 3,000, preferably 500 to 2,500.

The polyphenols of the formula II are also known compounds and the following may be mentioned as suitable polyphenols: pyrocatechol, resorcinol, hydroquinone, pyrogallol, phloroglucinol, hydroxyhydroquinone, bisphenol A, bis(hydroxyphenyl)-methane, 1,3,3-tris-(p-hydroxyphenyl)-propane and, especially, the condensation products of formaldehyde and phenol or cresol, which are described as novolacs or cresol novolacs and which contain from 2 to 6, preferably from 2 to 5, phenolic hydroxyl groups per molecule. Furthermore, alkyl-substituted diphenols or polyphenols can also be employed, such as, for example: 4-methylpyrocatechol, 2,6-dihydroxytoluene, 3,5-dihydroxytoluene or methylhydroquinone.

The reaction products according to the invention, containing phenolic hydroxyl groups, of polysiloxanes and polyphenols are employed in essentially the same manner as the conventional unmodified polyphenols. The reaction products according to the invention can be used to cure or modify epoxide resins and give flexible, hydrophobic plastics having valuable mechanical and dielectric properties. The moulded materials based on epoxide resins and manufactured using the reaction products according to the invention show a lower water absorption than epoxide resins cured with conventional phenols.

The reaction products according to the invention can be processed, by themselves or mixed with conventional polyphenols, conjointly with epoxide resins in accordance with all known processes. If desired, the curing of the epoxide resin with the reaction products according to the invention can also be carried out in two stages, by first prematurely discontinuing the curing reaction, which gives a curable precondensate which is still fusible and soluble (a so-called "B-stage").

The reaction products according to the invention can also be used as a mixture with other, unmodified polyphenols. Such mixtures can also be manufactured in accordance with the process of the invention by choosing the phenolic component in excess, whereby mixtures of polyphenols which have been (so-called) "advanced" with polysiloxanes, and of unconverted phenols, are obtained.

The modification of epoxide resins with the reaction products according to the invention can also be carried out by using an excess of the epoxide resin to be modified and reacting it with the reaction products according to the invention to give adducts containing epoxide groups. These adducts can then, if desired, be cured with epoxide resin curing agents other than the polyphenol, such as polyamines or polycarboxylic acid anhydrides.

The reaction products according to the invention can be used in conjunction with all polyepoxide compounds to manufacture curable mixtures to which customary additives, such as extenders, fillers and reinforcing agents, pigments, organic solvents, plasticisers, flow control agents, thixotropic agents, flameproofing substances or mould release agents can be added before curing.

EXAMPLE 1

97.0 g (0.8 hydroxyl equivalent) of a novolac which was obtained from formaldehyde and p-cresol in accordance with the customary condensation process and which contains an average of 4 hydroxyl groups per molecule, were mixed with 87.5 g (0.1 mol) of a poly-(phenyl-methyl-siloxane) having methoxy end groups and an average molecular weight of 875, whereby a two-phase reaction mixture was produced. This was heated to 180° C, and from 175° C onwards elimination and distillation of methanol occurred. After about 20 hours the elimination of methanol had ceased. Thereafter, all lowerboiling components were removed at 180° C and 15 mm Hg, giving a homogeneous reaction product which solidified to a glassy mass on cooling to room temperature.

According to the NMR spectrum, SiOCH$_3$ bands are no longer detectable. The hydroxyl equivalent weight was 294.

EXAMPLE 2

97.0 g (0.8 hydroxyl equivalent) of a novolac which was obtained from formaldehyde and cresol in accordance with the customary processes and which contains an average of 4 hydroxyl groups per molecule, were mixed with 109.0 g (0.1 mol) of a linear poly-(phenyl-methyl-siloxane) having methoxy end groups and an average molecular weight of 1,090, whereby a two-phase turbid reaction mixture was obtained. This was then warmed to 180° C, and from 175° onwards elimination and distillation of methanol occurred. After 24 hours, the elimination of methanol had ceased. Thereafter, all lower-boiling components were removed at 180° C and 15 mm Hg, giving a homogeneous product which solidified to a glassy mass on cooling to room temperature.

According to the nuclear resonance spectra, SiOCH$_3$ bands are no longer detectable. The hydroxyl equivalent weight of the product obtained was 287.

APPLICATION EXAMPLES

EXAMPLES I TO III

The epoxide resin moulding materials I – III listed in Table I below are prepared as follows:

The cresol novolac, (so-called) "advanced" with poly(phenyl-methyl-siloxane), obtained according to Example 1, is fused in a 1 liter reaction flask together with epoxidised cresol novolac and cresol novolac at 140° C, whilst stirring. After thorough mixing, the melts are cooled as thin layers and then ground.

308 g of each of the epoxide resin powders obtained are then weighed out into a 5 liter ball mill together with 12 g of a curing accelerator consisting of a 25% strength solid solution of 2-ethylimidazole in cresol novolac, 670 g of quartz powder, 5 g of "OP Wachs" (partially esterified montan wax, a commercial product of Messrs, FARBWERKE HOECHST) and 5 g of gas black, and the mixture is ground for 15 hours. The pulverulent moulding materials are then tableted and the tablets are warmed to 70° – 80° C in a high frequency prewarming apparatus and moulded by the transfer moulding process in moulds heated to 170° C.

The properties of the mouldings are also listed in Table I.

COMPARISON EXAMPLE

The moulding material used for comparison was prepared, and processed, analogously to the moulding materials I – III except that it does not contain any cresol novolac which has been (so-called) "advanced" with polysiloxanes. The properties of this moulding material are also shown in Table I.

resistance to water when compared to the unmodified conventional moulding materials.

EXAMPLE IV

All raw materials indicated in Table I are weighed out into a 5 liter ball mill and ground for 15 hours. In contast to Examples I to III, the epoxide resin is, in this case, not fused beforehand with the cresol novolac and the siloxane-containing component. The resulting pulverulent product is then granulated, tableted, prewarmed to 70° – 80° C and moulded by the transfer moulding process in moulds heated to 170° C.

The properties of the product can be seen from Table I.

We claim:

1. A reaction product of a polysiloxane and a novolac, said product having phenolic hydroxyl groups and being obtained by reacting a polysiloxane compound of the formula I

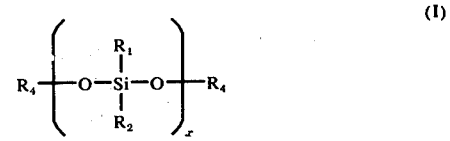

wherein $R_1$ and $R_2$ are independently members selected from the group consisting of methyl, ethyl, propyl, and phenyl or wherein $R_1$ and $R_2$ are independently different members along the polysiloxane chain, said members being selected from the group consisting of methyl, ethyl, propyl and phenyl, $R_4$ is alkyl or acyl and x is a number of from 2 to 30, with a novoloc having an average of four hydroxyl groups, said novolac being obtained from formaldehyde and cresol, at elevated temperatures, using 1.2 to 10 equivalents of phenolic hydroxyl per 1 equivalent of alkyl or acyl, said equivalents of phenolic hydroxyl being present in the novolac reactant and said equivalents of alkyl or acyl being Table I

| Composition and properties of the moulding materials | | | | | |
| Example | Comparison example | I | II | III | IV |
| --- | --- | --- | --- | --- | --- |
| Raw materials | Amounts used in g | | | | |
| Epoxidised cresol novolac [1] | 205 | 201 | 197 | 188 | 201 |
| Cresol novolac [2] | 103 | 96 | 89 | 78 | 97 |
| Cresol novolac, (so-called) "advanced" with polysiloxane, according to Example 1 | — | 11 | 22 | 44 | 11 |
| Accelerator [3] | | 12 | | | 11 |
| Quartz powder | | 670 | | | — |
| Novaculite quartz | | — | | | 370 |
| Glass fibres | | — | | | 300 |
| OP Wachs | | 5 | | | 7 |
| Gas black | | 5 | | | 3 |
| Properties of the moulding materials | | | | | |
| Spiral flow (EMMI) at 150° C, 70 kp/cm$^2$ (inches) | 24 | 23 | 23 | 28 | 27 |
| Flexural strength (DIN) (kp/mm$^2$) | 10.3 | 10.6 | 10.2 | 10.1 | 10.2 |
| Dielectric loss factor tg δ (50 c/s) | 1.9 | 1.85 | 1.90 | 2.05 | 1.0 |
| Dielectric loss factor after 2 hours in boiling water | 3.1 | 2.10 | 2.35 | 2.60 | 1.3 |
| Volume resistance (Ohm × cm) | 2.8×10$^{15}$ | 4.1×10$^{15}$ | 3.8×10$^{15}$ | 3.2×10$^{15}$ | 3×10$^{15}$ |
| Volume resistance after 2 hours in boiling water | 7.4×10$^{14}$ | 2.5×10$^{15}$ | 7.0×10$^{15}$ | 5.5×10$^{15}$ | 1×10$^{15}$ |

[1] Epoxidised cresol novolac, melting point (Kofler method) = 75° C, epoxide content = 4.65 equivalents/kg
[2] Cresol novolac, melting point, (Kofler method) = 100° C, content of phenolic hydroxyl groups = 8.5 equivalents/kg
[3] Accelerator = 25% strength solid solution of 2-ethylimidazole in cresol novolac 2); melting point = 70° C As can be seen from a comparison of the dielectric properties, the moulding materials modified with polymethylphenylsiloxane are distinguished by better present in the polysiloxane reactant.

* * * * *